UNITED STATES PATENT OFFICE.

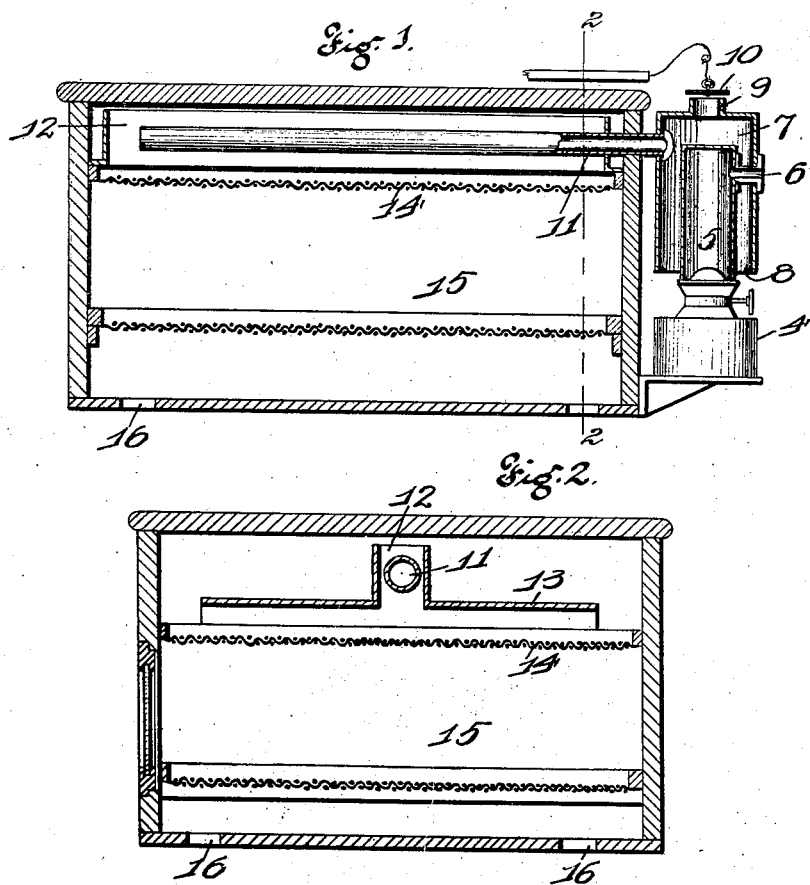

JAMES L. NIX, OF HOMER CITY, PENNSYLVANIA.

HEATING MECHANISM FOR INCUBATORS.

No. 896,236.     Specification of Letters Patent.     Patented Aug. 18, 1908.

Application filed December 5, 1905. Serial No. 290,469.

*To all whom it may concern:*

Be it known that I, JAMES L. NIX, citizen of the United States, and resident of Homer City, Pennsylvania, have invented certain new and useful Improvements in Heating Mechanisms for Incubators, of which the following is a specification.

My invention relates to improvements in heating mechanisms for incubators, and has for its object, means for supplying the interior of an incubator with a constant supply of heated fresh air taken directly from the exterior of the incubator, and diffused equally through the egg-chamber.

In the drawings—Figure 1 is a longitudinal vertical view in mid-section of the device embodying my invention. Fig. 2 is a transverse vertical sectional view taken on the line 2—2 in Fig. 1.

The source of heat supply indicated in the drawings is the lamp 4, whose burner is surrounded by a vertical chimney 5 closed at its top, and having an outlet flue 6 at one of its sides whereby the fumes of the lamp are conveyed to a point where they cannot contaminate the hot-air supply used in the machine. Surrounding the chimney 5, I have provided the jacket 7, open at its bottom as indicated by the numeral 8, and having a vertical flue 9 at its top, which is normally closed by the valve 10.

The heating-jacket 7 is provided at its side nearest the incubator with the heated air inlet flue 11 whereby the air heated in the jacket 7 is conducted to the interior of the incubator. The flue 11 extends horizontally into the incubator and is located between two walls forming a vertical flue 12, and the lower ends of the walls flare outwardly into plates 13.

Beneath the plates 13, and parallel therewith, is mounted a sheet 14 of perforate material which serves the purpose of aiding in the diffusion of the heated air, and also protecting the plates 13 and their connections from accidental injury.

The problem in incubation with which my invention has to deal, is to overcome the formation of localized eddy-currents within the incubator, said eddy-currents leading to lack of uniformity in heat distribution, and to consequent injury to the hatch. The heated air passing into the vertical flue 12 immediately rises, and issuing from the top of the flue 12, is forced outwardly in every direction to the outer walls of the machine, whence it is forced downwardly around the plates 13 and through the sheet 14 to heat the egg-chamber 15. The air within the incubator is thus kept in constant circulation. The plates 13 being imperforate (except that they are provided with an opening which registers with the bottom of the flue 12) and the sheet 14 being perforate, there is in practice a constant radial movement of the heated air between the plates 13 and sheet 14 to the bottom of the flue 12, then upwardly through the flue 12, that part of the body of heated air which passes through the sheet 14 to the interior of the egg chamber 15 being equably diffused throughout the egg chamber by reason of the construction shown and described.

The flue 11 is extended transversely nearly across the machine, as illustrated in Fig. 1, and the flue 12 is extended to surround the flue 11 upon all sides, as illustrated in Fig. 1. The plates 13 will then be made to correspond to the inner dimensions of the incubator, extending nearly to the walls at all sides.

For the purpose of additional ventilation, direct bottom-openings 16 are preferably provided in the bottom of the incubator.

The degree of heat within the incubator is controlled by means of the valve 10 and the thermostatic connection not shown; this means of heat regulation being old in the art.

I claim:

1. In an incubator, a heating mechanism comprising a heating jacket mounted vertically, and open at its bottom; means whereby the interior of said jacket is heated; a longitudinal inlet flue extending from the heating jacket to the interior of the incubator; a vertical flue mounted within the incubator, and into which the supply of heated air is conducted by the last named flue; a horizontal plate mounted at the bottom of said vertical flue and having an opening registering with the bottom of said vertical flue; and a sheet of perforate material horizontally mounted beneath, and parallel with said plate, substantially as specified.

2. In an incubator, a combination of a heating jacket mounted upon the exterior of the incubator; means for heating the interior of said heating jacket, an inlet flue extending from the interior of the heating jacket to the interior of the incubator; a vertical flue surrounding the inner end of said inlet flue, and open at its top and bottom; a plate mounted horizontally at the bottom of said vertical flue and having an opening registering with the bottom of said vertical flue; and a sheet of perforate material mounted horizontally in the interior of the incubator beneath and parallel with said plate, substantially as specified.

In testimony whereof, I have signed my name to this specification, in presence of two subscribing witnesses.

JAMES L. NIX.

Witnesses:
H. H. SCOTT,
B. B. MCCONNAUGHEY.